US011417352B2

(12) United States Patent
Zhang (10) Patent No.: US 11,417,352 B2
(45) Date of Patent: Aug. 16, 2022

(54) IN-VEHICLE INTELLIGENT WIFI MICROPHONE AND AUDIO DELAY PROCESSING METHOD THEREFOR (71) Applicant: SHENZHEN CHARMBIRD TECHNOLOGY CO., LTD., Guangdong (CN)

(72) Inventor: Tiger Zhang, Shenzhen (CN)

(*) Notice: Subject to any disclaimer, the term of this patent is extended or adjusted under 35 U.S.C. 154(b) by 289 days.

(21) Appl. No.: 16/835,250

(22) Filed: Mar. 30, 2020

(65) Prior Publication Data
US 2020/0258536 A1  Aug. 13, 2020

Related U.S. Application Data (63) Continuation-in-part of application No. PCT/CN2018/105018, filed on Sep. 11, 2018.

(30) Foreign Application Priority Data

Sep. 30, 2017  (CN) .......................... 201710937475.7

(51) Int. Cl.
G10L 21/0224    (2013.01)
H04W 4/48      (2018.01)
(Continued)

(52) U.S. Cl.
CPC .......... *G10L 21/0224* (2013.01); *H04R 1/083* (2013.01); *H04W 4/48* (2018.02); *G10L 2021/02163* (2013.01)

(58) Field of Classification Search
CPC ...... G10L 21/0224; G10L 2021/02163; H04R 1/083; H04R 1/1041; H04R 1/1025;
(Continued)

(56) References Cited

U.S. PATENT DOCUMENTS

2007/0165875 A1   7/2007   Rezvani et al.
2012/0313768 A1*  12/2012  Campbell .......... G07C 9/00309
                                                340/438
(Continued)

FOREIGN PATENT DOCUMENTS

CN   102866917    1/2013
CN   106004698    10/2016
(Continued)

Primary Examiner — Eugene Yun
(74) Attorney, Agent, or Firm — Sandy Lipkin (57) ABSTRACT Disclosed in the invention are an in-vehicle intelligent WiFi microphone and an audio delay processing method therefor, by which the problem that the existing in-vehicle microphone is prone to interference and provides poor sound quality when FM signals are used to establish audio transmission with an in-vehicle entertainment system, can be solved. The in-vehicle intelligent WiFi microphone comprises a first microphone, a first main control circuit board, a first rechargeable battery and a first main mounting housing. The first microphone, the first main control circuit board and the first rechargeable battery are arranged in the first main mounting housing. The first microphone is located at an upper end of the first main mounting housing, and the first microphone and the first rechargeable battery are electrically connected to the first main control circuit board. The first main control circuit board is integrally provided with a first main control processor, as well as an audio mixing processing module, an FM receiving module and a WiFi communication module, which are electrically connected to the first main control processor.

6 Claims, 8 Drawing Sheets (51) Int. Cl.
    *H04R 1/08*       (2006.01)
    *G10L 21/0216*    (2013.01)
(58) Field of Classification Search
    CPC ....... H04R 2420/07; H04R 3/00; H04W 4/48;
                              H04W 4/80; G06F 3/16
    USPC ...................................................... 455/569.2
    See application file for complete search history.

(56) References Cited

U.S. PATENT DOCUMENTS

2018/0308462 A1* 10/2018 Wang ....................... G06F 3/165
2018/0367879 A1* 12/2018 Zou ......................... H03G 5/165

FOREIGN PATENT DOCUMENTS

| CN | 205726359 | 11/2016 |
| CN | 106254978 | 12/2016 |

* cited by examiner

IN-VEHICLE INTELLIGENT WIFI MICROPHONE AND AUDIO DELAY PROCESSING METHOD THEREFOR

CROSS-REFERENCE TO RELATED APPLICATION

This application is a continuation in part of international PCT application serial no. PCT/CN2018/105018, filed on Sep. 11, 2018, which claims the priority benefit of China application no. 201710937475.7, filed on Sep. 30, 2017. The entirety of each of the above-mentioned patent applications is hereby incorporated by reference herein and made a part of this specification.

TECHNICAL FIELD

The present invention relates to the technical field of in-vehicle entertainment devices, in particular to an in-vehicle intelligent WiFi microphone and an audio delay processing method therefor.

BACKGROUND

WiFi, with a full form of Wireless Fidelity, is a technology that allows electronic devices to connect to a wireless local area network (WLAN), and often uses the 2.4G UHF or 5G SHF ISM radio frequency bands. Almost all smart mobile devices support WiFi for Internet access, which is currently the most widely used wireless network transmission technology.

With the improvement of people's living standard, more and more families are buying cars, so that cars have become the closest activity space in life, and people hope to get more diversified experience in cars. A car generally integrates with various in-vehicle systems, such as an in-vehicle entertainment system, which refers to an entertainment system with radio and video playback functions. With the increasing intelligence of in-vehicle systems, many in-vehicle systems have gradually begun to integrate with WiFi wireless network function modules so as to obtain wireless communication connection with external devices through WiFi devices.

With the popularity of smart mobile devices (such as smart phones), people's life has been inseparable from smart phones. However, smart phones and most in-vehicle systems are two completely separated ecologies. Due to their specific product characteristics and independence, in-vehicle systems have the problems of complex hardware update, high cost and complicated resource and software update. Taking an in-vehicle karaoke system for example, it has the problems that it is inconvenient to choose songs, the capacity for storing songs is small, the update of the music library is complicated, etc. As for a local in-vehicle navigation system, it has the problems that maps may be out-of-date, the update is complicated, the operation is inconvenient, etc. Therefore, it is an urgent need to connect smart phones with in-vehicle systems, especially with the popularity of smart mobile devices (such as smart phones), passengers are accustomed to using smart mobile devices (such as smart phones) to choose songs, listen to music, sing karaoke and navigate.

At present, some in-vehicle microphone devices that have been developed generally transmit audio signals of the microphones to in-vehicle entertainment systems by means of FM radio frequency. However, FM frequency modulation is limited to signal quality and intensity, so that it is difficult to provide perfect sound quality, especially when there is a lot of interference, the sound quality may be substantially unusable for music appreciation. Moreover, the resistance of FM frequency modulation signals to interference is very low, and due to poor signal environment during car driving, FM frequency modulation signals are prone to interference and noises may be generated.

Technical Problem

A technical problem to be solved in the present invention is to provide an in-vehicle intelligent WiFi microphone and an audio delay processing method therefor, by which the problem that the existing in-vehicle microphone is prone to interference and has poor sound quality when FM signals are used to establish audio transmission with an in-vehicle entertainment system, can be solved.

Solution to the Problem

Technical Solution

In order to solve the above technical problem, the present invention specifically adopts the following technical solution:

an in-vehicle intelligent WiFi microphone for in-vehicle karaoke entertainment includes a first microphone, a first main control circuit board, a first rechargeable battery and a first main mounting housing, wherein the first microphone, the first main control circuit board and the first rechargeable battery are arranged in the first main mounting housing, the first microphone is located at an upper end of the first main mounting housing, the first microphone and the first rechargeable battery are electrically connected to the first main control circuit board, and the first main control circuit board is integrally provided with a first main control processor as well as an audio mixing processing module, an FM receiving module and a WiFi communication module which are electrically connected to the first main control processor; the first microphone acquires an external audio signal, the audio mixing processing module performs audio processing on the acquired audio signal, and then the WiFi communication module transmits the processed audio signal to an in-vehicle system for real-time playback; and the WiFi communication module performs signal transmission with a smart mobile device.

Further, the first main control circuit board is further provided with a data storage module, and the data storage module is electrically connected to the first main control processor.

Further, the first main control circuit board is provided with a charging power module, and the charging power module is electrically connected to the first main control processor.

Further, the first main control circuit board is also integrally provided with a speech recognition module, and the speech recognition module is electrically connected to the first main control processor.

Further, the first main control circuit board is also integrally provided with a key control module, and the key control module is electrically connected to the first main control processor.

Further, the in-vehicle intelligent WiFi microphone further includes an OLED screen, and the OLED screen is electrically connected to the first main control circuit board.

Further, the first main control circuit board is integrally provided with a moving control key, a first on-off key and a first audio control key, and the first on-off key, the moving control key and the first audio control key are disposed on the first main mounting housing in a penetrating manner.

Further, the first main control circuit board is also integrally provided with a USB transmission module which performs data transmission and charging connection with external through a USB interface.

Further, a first protection shield is arranged at the upper end of the first main mounting housing, a charging jack is arranged at a lower end of the first main mounting housing, the charging jack mates with an in-vehicle charger or a charging plug connector, and the in-vehicle charger includes a microphone mounting seat and a connector connected to a vehicle USB interface.

In order to provide two-player or even multi-player karaoke, an auxiliary microphone is provided to cooperate with the in-vehicle intelligent WiFi microphone, and the auxiliary microphone includes a second main mounting housing, a second main control circuit board, a second rechargeable battery and a second microphone, wherein the second microphone, the second main control circuit board and the second rechargeable battery are arranged in the second main mounting housing, the second microphone is located at an upper end of the second main mounting housing, the second microphone and the second rechargeable battery are electrically connected to the second main control circuit board, and the second main control circuit board is integrally provided with a second main control processor as well as an audio mixing processing module, an FM transmission module and a Bluetooth communication module which are electrically connected to the second main control processor; and the second microphone acquires an external audio signal, the audio mixing processing module performs audio processing on the acquired audio signal, and then the FM transmission module transmits the processed audio signal to the intelligent WiFi microphone.

Further, the second main control circuit board is also provided with a charging power module, and the charging power module is electrically connected to the second main control processor.

Further, the second main control circuit board is also integrally provided with a key control module, and the key control module is electrically connected to the second main control processor.

Further, the second main control circuit board is integrally provided with a second on-off key and a second audio control key, and the second on-off key and the second audio control key are disposed on the second main mounting housing in a penetrating manner.

Further, a second protection shield is arranged at the upper end of the second main mounting housing, a charging jack is arranged at a lower end of the second main mounting housing, the charging jack mates with an in-vehicle charger or a charging plug connector, and the in-vehicle charger includes a microphone mounting seat and a connector connected to a vehicle USB interface.

Further, the auxiliary microphone and the in-vehicle intelligent WiFi microphone are placed on a charging base, and the charging base is provided with a second charging slot and a first charging slot corresponding to the auxiliary microphone and the in-vehicle intelligent WiFi microphone, respectively.

Further, the charging base is also provided with a plurality of USB charging connectors.

The WiFi wireless communication technology is adopted for audio signal transmission between the in-vehicle intelligent WiFi microphone and the in-vehicle entertainment system. When people sing karaoke, the audio signal acquired by the microphone is required to be played synchronously with an accompaniment or an audio of an original singer played by the in-vehicle entertainment system as far as possible so as to provide a good sound experience. Generally, in a narrow space like a car, the time delay between the two should be less than 80 ms, otherwise, the sound received by human ears may show obvious asynchronization between the two, resulting in a very poor effect of karaoke. When audio signals are transmitted by means of FM radio frequency, the data transmission channel is not shared with other devices, so that no obvious delay problem occurs during transmission of audio signals. However, when the WiFi wireless communication technology is adopted for audio signal transmission, a signal delay of about 20 ms may be generated after the audio signal acquired by the microphone is subjected to audio processing in a DSP chip, and then a main control MCU chip receives the audio signal processed by the DSP chip and distributes the audio signal to a WiFi chip for transmission. The main control MCU chip needs to handle operations of all chips in the whole microphone, so that there are always multiple processes to be handled, and the order for handling the processes is generally determined according to the times they reach the master control MCU chip, which inevitably causes a significant signal delay on the audio signal, often more than 80 ms, thereby affecting the effect of karaoke. In order to solve the problem of signal delay which occurs when the WiFi wireless communication technology is adopted for audio signal transmission, the present invention further provides an audio delay processing method for real-time audio signal transmission between an in-vehicle intelligent WiFi microphone and an in-vehicle entertainment system, including the following steps of:

creating a daemon process, and judging whether an audio signal is transmitted to a main control processor or not by the daemon process; and when an audio signal is transmitted to the main control processor, suspending all processes of the main control processor by the daemon process, and pushing the audio signal to a WiFi module by the main control processor for signal transmission.

Further, before a step of transmitting the audio signal to the main control processor, the audio signal is acquired by a microphone, and an audio mixing processing module performs audio processing on the audio signal, wherein the audio mixing processing module is marked by the daemon process in advance.

Further, the audio delay processing method further includes a step of: when the in-vehicle entertainment system receives the audio signal, performing playback of the audio signal preferentially by a main control processor of the in-vehicle entertainment system according to a pre-marked singing mode.

Beneficial Effects of the Invention

Beneficial Effects

By adopting the above technical solution, the in-vehicle microphone is integrated with the WiFi module and provided with the rechargeable battery, so that when an external audio signal is acquired by the microphone, audio information can be transmitted to the in-vehicle entertainment system in real time through the WiFi module and played by in-vehicle sound equipment, thereby achieving the function of karaoke and overcoming the problems of proneness to interference and poor sound quality of audio transmission of the FM transmission module. After a connection is established between the WiFi communication module and a smart mobile device (smart phone) and the like, audio resources of the smart phone can be transmitted to the in-vehicle entertainment system, so that resource sharing is achieved. Moreover, the in-vehicle microphone has its own data storage module and is capable of storing some audio resources, so that the audio resources can be called by the smart mobile device or the key control module and transmitted to the in-vehicle entertainment system for playback even when it is not in karaoke, thereby providing diversified in-vehicle entertainment experiences with one in-vehicle microphone.

In order to overcome the problem of audio delay which occurs when the WiFi module is adopted for audio signal transmission, the audio signal sent to the main control processor by the audio mixing processing module is preferentially processed via software, and the daemon process is created to judge whether the audio signal is in a singing mode or not or mark the audio mixing processing module DSP in advance, so that the audio signal can be transmitted timely, preventing a too large audio signal delay which affects the experience of karaoke.

In the figures, 100—in-vehicle intelligent WiFi microphone, 200—auxiliary microphone, 300—charging base;
110—first main mounting housing, 120—first main control circuit board, 130—first rechargeable battery, 140—charging jack, 150—first microphone, 160—first protection shield, 170—liquid crystal screen, 121—first on-off key, 122—first audio control key, 123—moving control key, 124—USB interface;
210—second main mounting housing, 220—second main control circuit board, 230—second rechargeable battery, 240—charging connector, 250—second microphone, 260—second protection shield, 221—second on-off key, 222—second audio control key;
310—first charging slot, 320—second charging slot, 330—USB charging connector.

DETAILED DESCRIPTION OF THE INVENTION

Preferred Embodiments of the Invention

Embodiments of the present invention are further described below with reference to the accompanying drawings. It is to be understood that the description of these embodiments is intended to aid in the understanding of the invention and is not to be construed as limiting the invention. Furthermore, the technical features referred to in the various embodiments of the present invention described below may be combined with each other as long as they do not conflict with each other.

Embodiment 1

Figure 1:
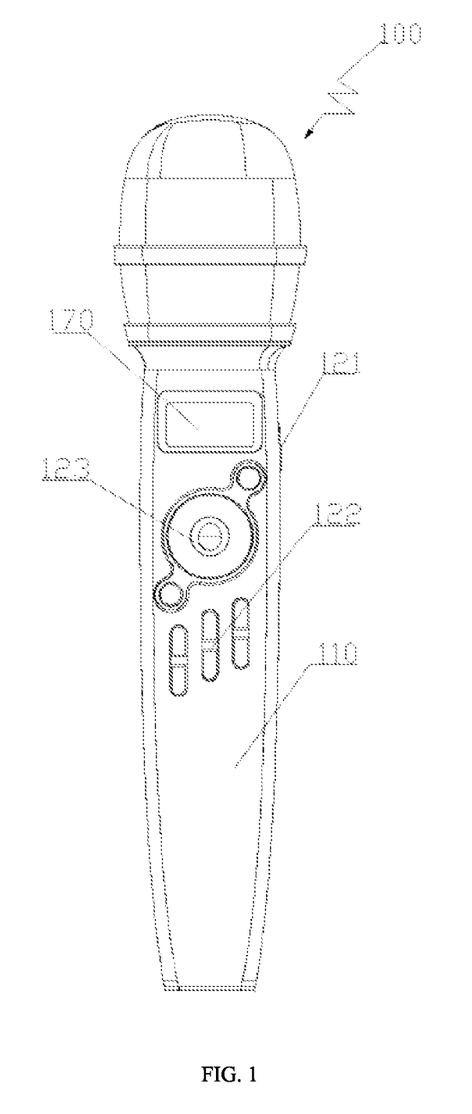
FIG. 1 is a front view of an in-vehicle intelligent WiFi microphone according to the present invention.
Figure 2:
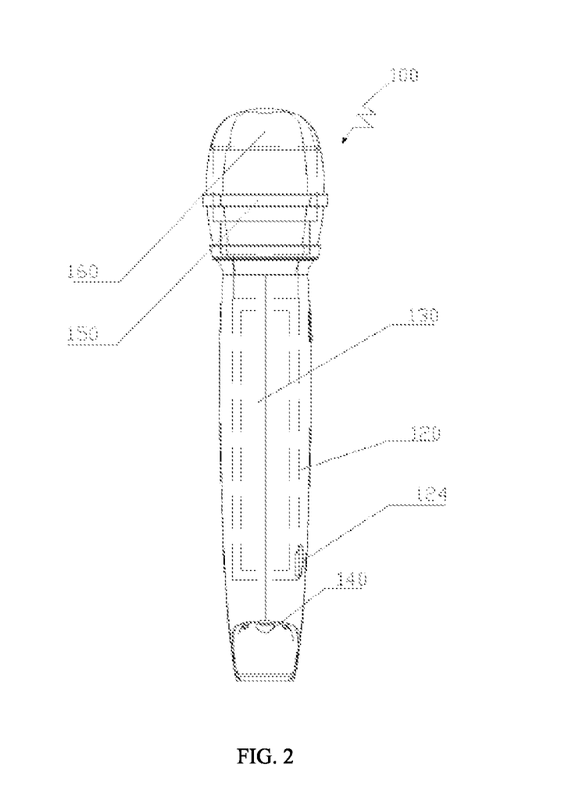
FIG. 2 is a rear view of the in-vehicle intelligent WiFi microphone of the present invention.
Figure 3:
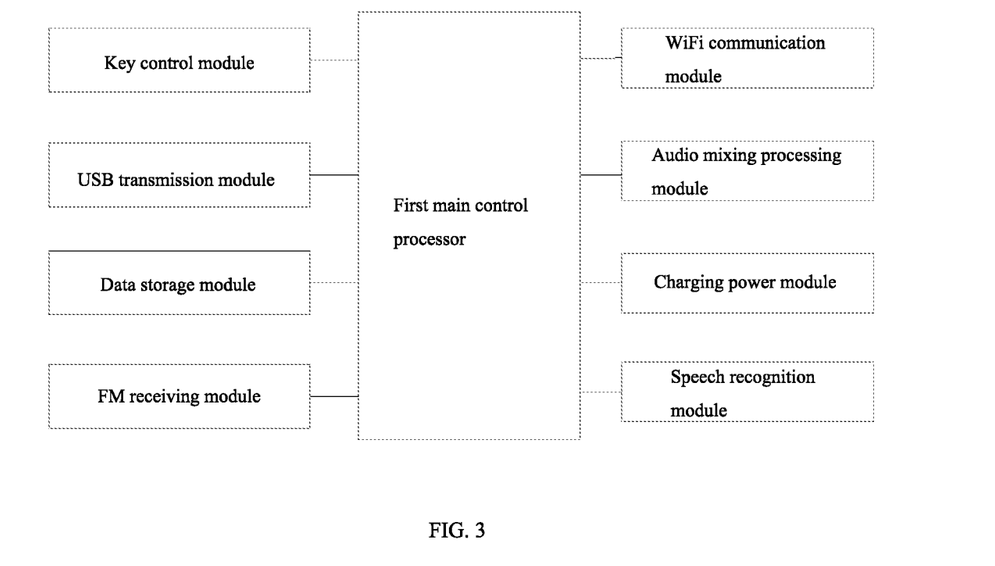
FIG. 3 is a block diagram of a control system of the in-vehicle intelligent WiFi microphone of the present invention.

As shown in FIGS. 1-3, the present invention provides an in-vehicle intelligent WiFi microphone 100 for in-vehicle karaoke entertainment, including a first microphone 150, a first main control circuit board 120, a first rechargeable battery 130 and a first main mounting housing 110, wherein the first microphone 150, the first main control circuit board 120 and the first rechargeable battery 130 are arranged in the first main mounting housing 110, the first microphone 150 is located at an upper end of the first main mounting housing 110, the first microphone 150 and the first rechargeable battery 130 are electrically connected to the first main control circuit board 120, and the first main control circuit board 120 is integrally provided with a first main control processor as well as an audio mixing processing module, an FM receiving module and a WiFi communication module which are electrically connected to the first main control processor; the first microphone acquires an external audio signal, the audio mixing processing module performs audio processing on the acquired audio signal, and then the WiFi communication module transmits the processed audio signal to an in-vehicle system for real-time playback; and the WiFi communication module performs signal transmission with a smart mobile device.

Wherein, the first main control circuit board 120 is further provided with a data storage module, and the data storage module is electrically connected to the first main control processor.

Wherein, the first main control circuit board 120 is provided with a charging power module, and the charging power module is electrically connected to the first main control processor.

Wherein, the first main control circuit board 120 is also integrally provided with a speech recognition module, and the speech recognition module is electrically connected to the first main control processor.

Wherein, the first main control circuit board 120 is also integrally provided with a key control module, and the key control module is electrically connected to the first main control processor.

Wherein, the in-vehicle intelligent WiFi microphone 100 further includes a liquid crystal screen 170, and the liquid crystal screen 170 is electrically connected to the first main control circuit board 120.

Wherein, the first main control circuit board 120 is integrally provided with a moving control key 123, a first on-off key 121 and a first audio control key 122, and the first on-off key 121, the moving control key 123 and the first audio control key 122 are disposed on the first main mounting housing 110 in a penetrating manner.

Wherein, the first main control circuit board 120 is integrally provided with a USB transmission module which performs data transmission and charging connection with external through a USB interface 124.

Wherein, a first protection shield 160 is arranged at the upper end of the first main mounting housing 110, a charging jack 140 is arranged at a lower end of the first main mounting housing 110, the charging jack 140 mates with an in-vehicle charger or a charging plug connector, and the in-vehicle charger includes a microphone mounting seat and a connector connected to a vehicle USB interface.

Embodiments of the Invention

Embodiment 2

Figure 4:
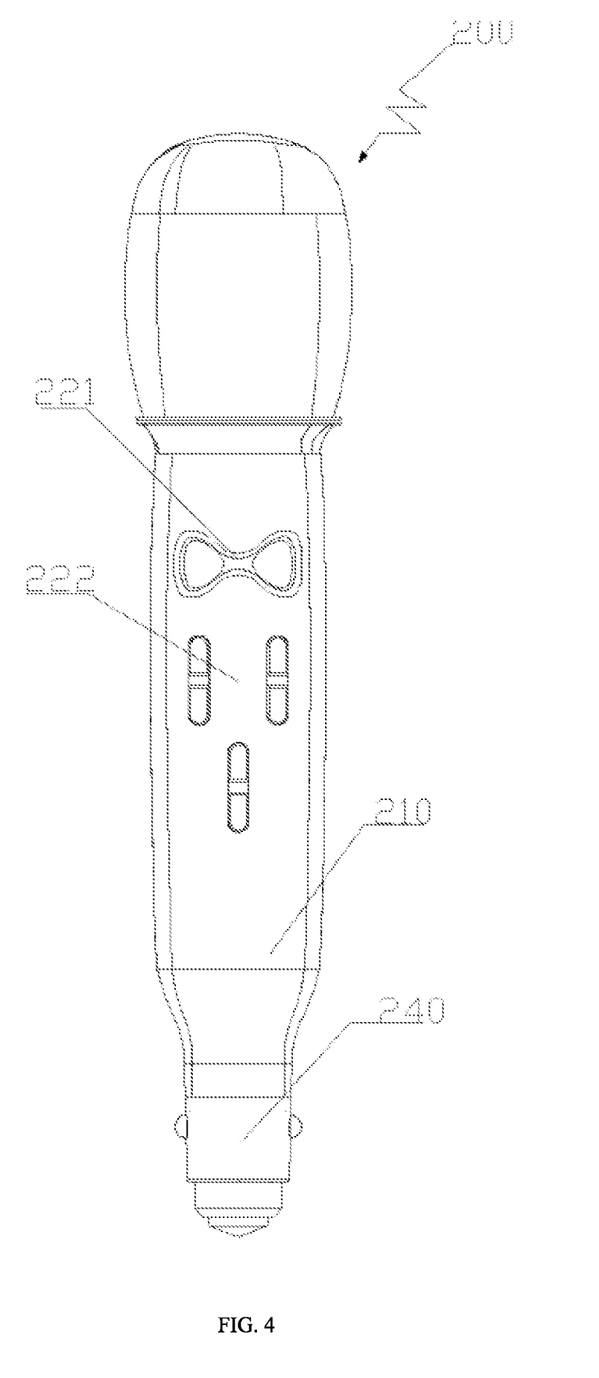
FIG. 4 is a front view of an auxiliary microphone of the present invention.
Figure 5:
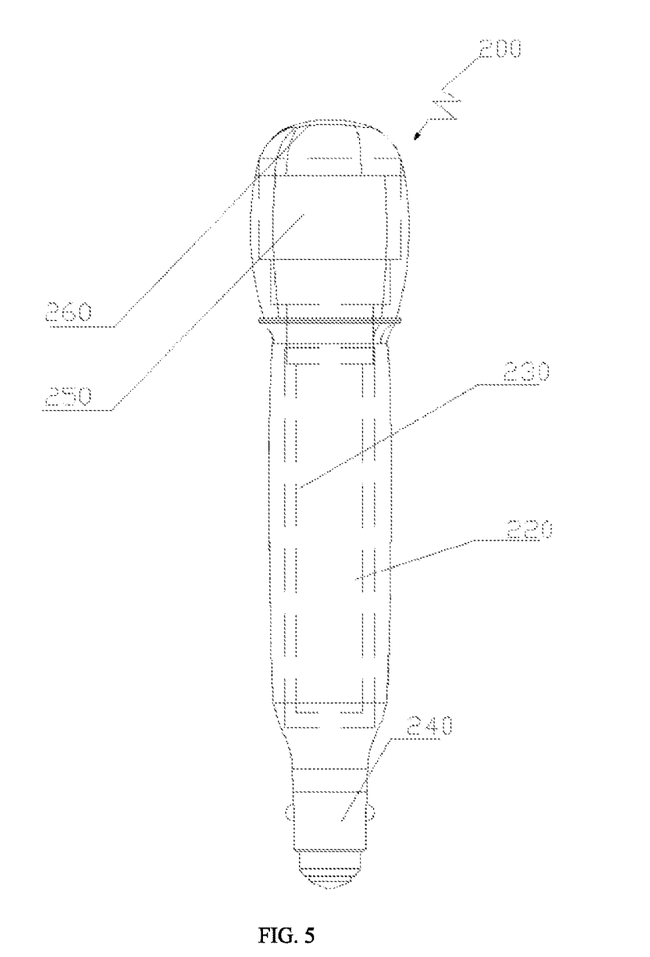
FIG. 5 is a rear view of the auxiliary microphone of the present invention.
Figure 6:
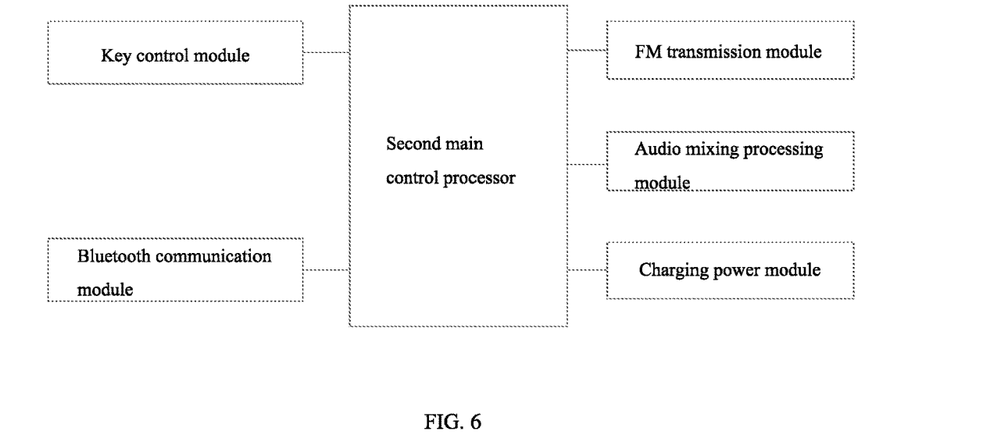
FIG. 6 is a block diagram of a control system of the auxiliary microphone of the present invention.

In order to provide two-player or even multi-player karaoke, an auxiliary microphone 200 is provided to cooperate with the in-vehicle intelligent WiFi microphone 100, and as shown in FIGS. 4-6, the auxiliary microphone 200 includes a second main mounting housing 210, a second main control circuit board 220, a second rechargeable battery 230 and a second microphone 250, wherein the second microphone 250, the second main control circuit board 220 and the second rechargeable battery 230 are arranged in the second main mounting housing 210, the second microphone 250 is located at an upper end of the second main mounting housing 210, the second microphone 250 and the second rechargeable battery 230 are electrically connected to the second main control circuit board 220, and the second main control circuit board 220 is integrally provided with a second main control processor as well as an audio mixing processing module, an FM transmission module and a Bluetooth communication module which are electrically connected to the second main control processor; and the second microphone acquires an external audio signal, the audio mixing processing module performs audio processing on the acquired audio signal, and then the FM transmission module transmits the processed audio signal to the intelligent WiFi microphone.

Wherein, the second main control circuit board 220 is also provided with a charging power module, and the charging power module is electrically connected to the second main control processor.

Wherein, the second main control circuit board 220 is also integrally provided with a key control module, and the key control module is electrically connected to the second main control processor.

Wherein, the second main control circuit board 220 is integrally provided with a second on-off key 221 and a second audio control key 222, and the second on-off key 221 and the second audio control key 222 are disposed on the second main mounting housing 210 in a penetrating manner.

Wherein, a second protection shield 260 is arranged at the upper end of the second main mounting housing 210, a charging jack 240 is arranged at a lower end of the second main mounting housing 210, the charging jack 240 mates with an in-vehicle charger or a charging plug connector, and the in-vehicle charger includes a microphone mounting seat and a connector connected to a vehicle USB interface.

Figure 7:
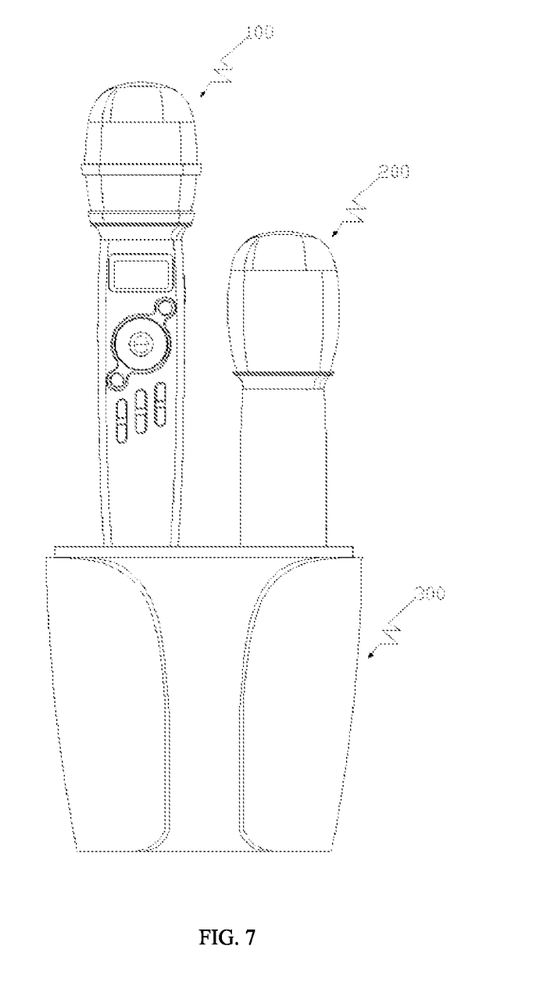
FIG. 7 is a front view of a dual-microphone configuration according to the present invention.
Figure 8:
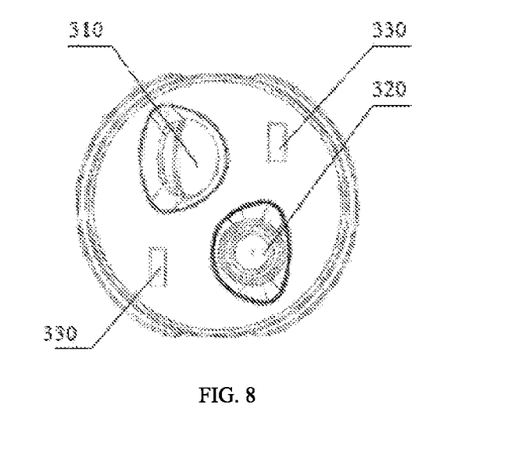
FIG. 8 is a top view of a charging base of the present invention.

As shown in FIGS. 7 and 8, the auxiliary microphone 200 and the in-vehicle intelligent WiFi microphone 100 are placed on a charging base 300, and the charging base 300 is provided with a second charging slot 320 and a first charging slot 310 corresponding to the auxiliary microphone 200 and the in-vehicle intelligent WiFi microphone 100, respectively.

Wherein, the charging base 300 is also provided with a plurality of USB charging connectors 330.

Figure 9:
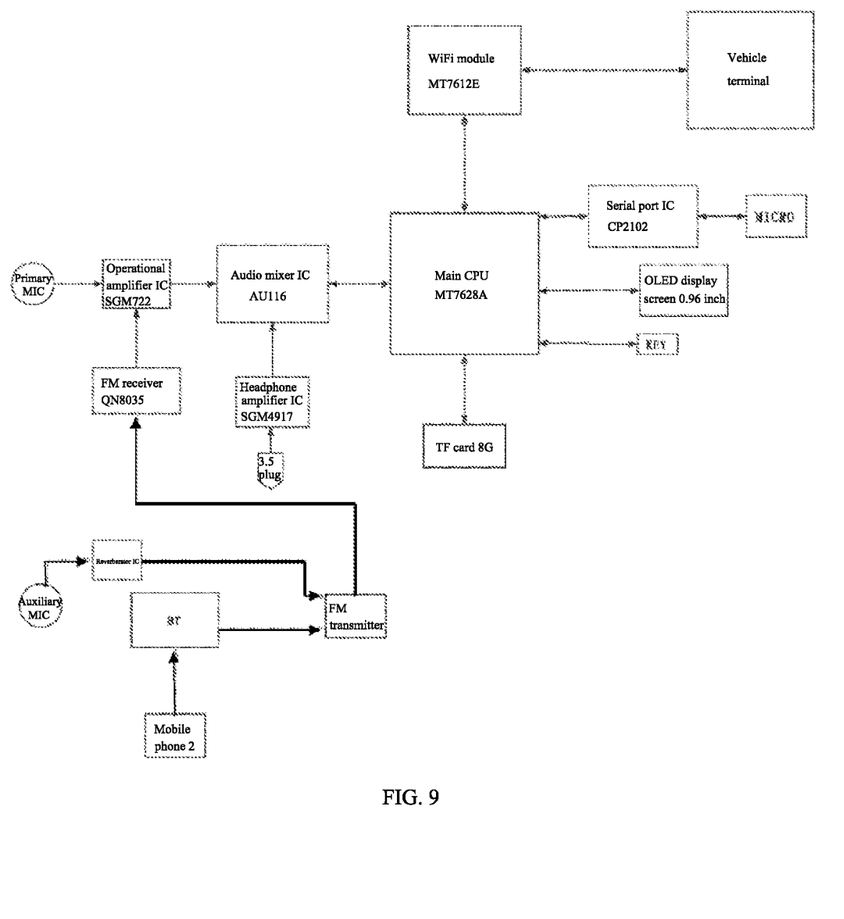
FIG. 9 is a diagram illustrating a signal connection relationship of the dual-microphone configuration according to the present invention.

As shown in FIG. 9, an audio signal acquired by an auxiliary MIC is subjected to audio processing by a reverberator IC, then the processed audio signal is transmitted to an operational amplifier IC through an FM transmission module and an FM receiving module to be processed together with an audio signal acquired by a primary MIC, the obtained audio signal is processed by an audio mixer IC and then transmitted to a main CPU, and the main CPU transmits the audio signal to a vehicle terminal through a WiFi module.

Embodiment 3

Figure 10:
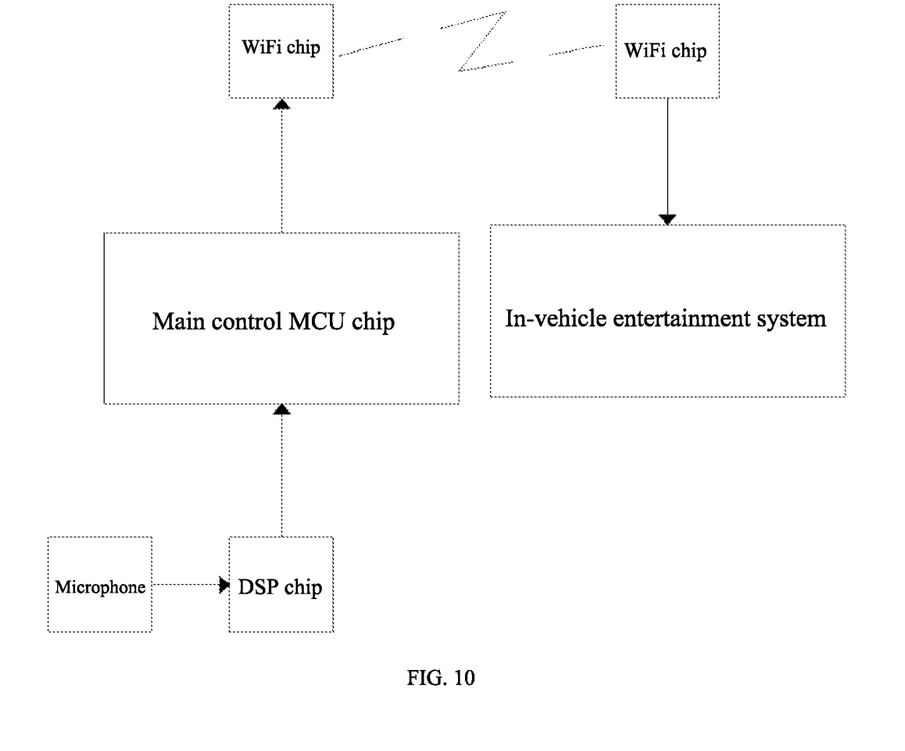
FIG. 10 is a block diagram of a microphone audio signal processing process of the present invention.
Figure 11:
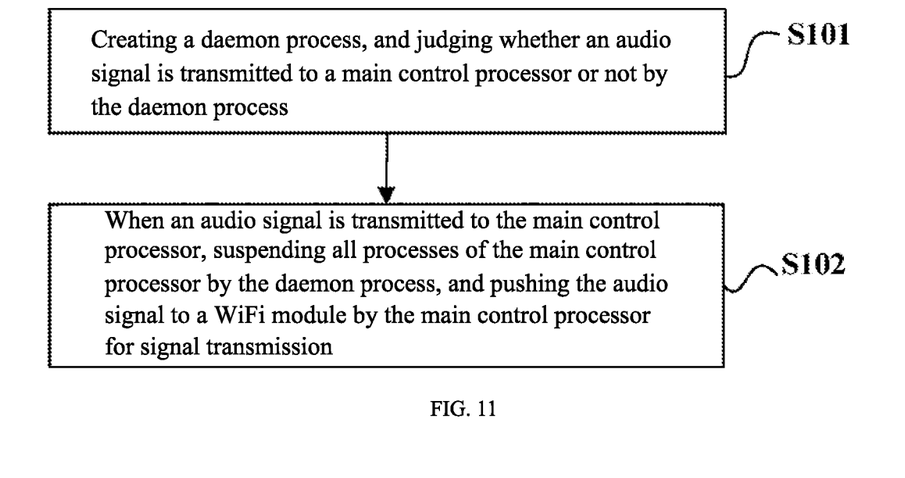
FIG. 11 is a flow diagram of a first audio delay processing method provided by the present invention.

As shown in FIG. 10, the WiFi wireless communication technology is adopted for audio signal transmission between the in-vehicle intelligent WiFi microphone and the in-vehicle entertainment system. When people sing karaoke, the audio signal acquired by the microphone is required to be played synchronously with an accompaniment or an audio of an original singer played by the in-vehicle entertainment system as far as possible so as to provide a good sound experience. Generally, in a narrow space like a car, the time delay between the two should be less than 80 ms, otherwise, the sounds received by human ears may show obvious asynchronization between the two, resulting in a very poor effect of karaoke. When audio signals are transmitted by means of FM radio frequency, the data transmission channel is not shared with other devices, so that no obvious delay problem occurs during transmission of audio signals. However, when the WiFi wireless communication technology is adopted for audio signal transmission, a signal delay of about 20 ms may be generated after the audio signal acquired by the microphone is subjected to audio processing in a DSP chip, and then a main control MCU chip receives the audio signal processed by the DSP chip and distributes the audio signal to a WiFi chip for transmission. The main control MCU chip needs to handle operations of all chips in the whole microphone, so that there are always multiple processes to be handled, and the order for handling the processes is generally determined according to the times they reach the master control MCU chip, which inevitably causes a significant signal delay on the audio signal, often more than 80 ms, thereby affecting the effect of karaoke. In order to solve the problem of signal delay which occurs when the WiFi wireless communication technology is adopted for audio signal transmission, As shown in FIG. 11, the present invention further provides an audio delay processing method, including the following steps that:

S101, a daemon process is created, and the daemon process judges whether an audio signal is transmitted to a main control processor or not; and S102, when an audio signal is transmitted to the main control processor, the daemon process suspends all processes of the main control processor, and the main control processor pushes the audio signal to a WiFi module for signal transmission.

Wherein, before a step that the audio signal is transmitted to the main control processor, the audio signal is acquired by a microphone, and an audio mixing processing module performs audio processing on the audio signal, wherein the audio mixing processing module is marked by the daemon process in advance.

Figure 12:
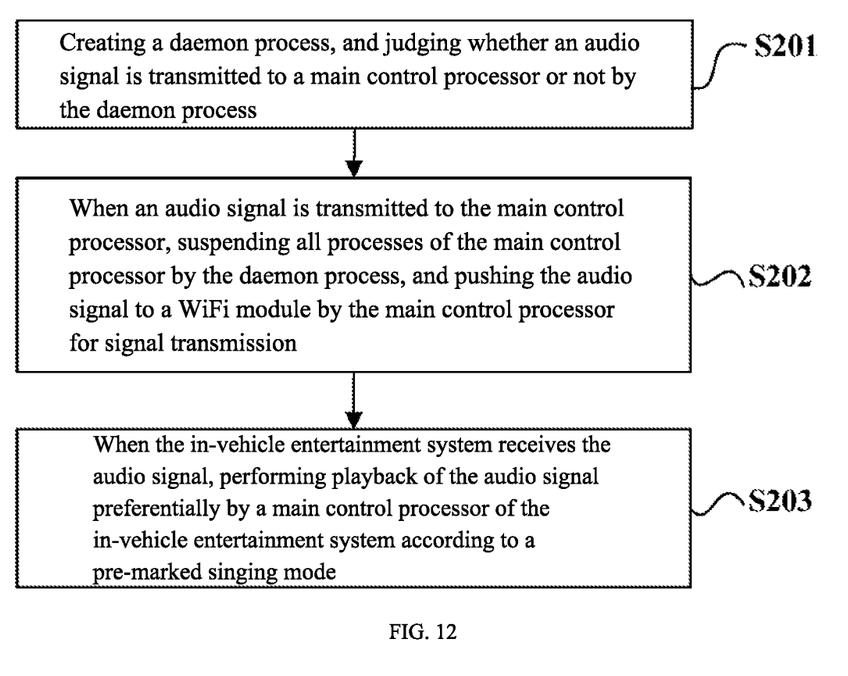
FIG. 12 is a flow diagram of a second audio delay processing method provided by the present invention.

As shown in FIG. 12, the present invention further provides an audio delay processing method for real-time audio signal transmission between an in-vehicle intelligent WiFi microphone and an in-vehicle entertainment system, including the following steps that:

S201, a daemon process is created, and the daemon process judges whether an audio signal is transmitted to a main control processor or not;

S202, when an audio signal is transmitted to the main control processor, the daemon process suspends all processes of the main control processor, and the main control processor pushes the audio signal to a WiFi module for signal transmission; and S203, when the in-vehicle entertainment system receives the audio signal, a main control processor of the in-vehicle entertainment system performs playback of the audio signal preferentially according to a pre-marked singing mode.

INDUSTRIAL UTILITY

By adopting the above technical solution, the in-vehicle microphone is integrated with the WiFi module and provided with the rechargeable battery, so that when an external audio signal is acquired by the microphone, audio information can be transmitted to the in-vehicle entertainment system in real time through the WiFi module and played by in-vehicle sound equipment, thereby achieving the function of karaoke and overcoming the problems of proneness to interference and poor sound quality of audio transmission of the FM transmission module. After a connection is established between the WiFi communication module and a smart mobile device (smart phone) and the like, audio resources of the smart phone can be transmitted to the in-vehicle entertainment system, so that resource sharing is achieved. Moreover, the in-vehicle microphone has its own data storage module and is capable of storing some audio resources, so that the audio resources can be called by the smart mobile device or the key control module and transmitted to the in-vehicle entertainment system for playback even when it is not in karaoke, thereby providing diversified in-vehicle entertainment experiences with one in-vehicle microphone.

In addition, with the auxiliary microphone, karaoke with multiple players at the same time can be achieved, thereby further improving the in-vehicle karaoke experience of the users.

In order to overcome the problem of audio delay which occurs when the WiFi module is adopted for audio signal transmission, the audio signal sent to the main control processor by the audio mixing processing module is preferentially processed via software, and the daemon process is created to judge whether the audio signal is in a singing mode or not or mark the audio mixing processing module DSP in advance, so that the audio signal can be transmitted timely, preventing a too large audio signal delay which affects the experience of karaoke.

The embodiments of the present invention have been described in detail above with reference to the accompanying drawings, but the present invention is not limited to the described embodiments. It will be apparent to those skilled in the art that various changes, modifications, substitutions and variations can be made in these embodiments without departing from the principles and spirit of the invention and yet fall within the scope of the invention.

What is claimed is:

1. An in-vehicle intelligent WiFi microphone for in-vehicle karaoke entertainment, comprising: a first microphone, a first main control circuit board, a first rechargeable battery and a first main mounting housing, wherein the first microphone, the first main control circuit board and the first rechargeable battery are arranged in the first main mounting housing, the first microphone is located at an upper end of the first main mounting housing, the first microphone and the first rechargeable battery are electrically connected to the first main control circuit board, and the first main control circuit board is integrally provided with a first main control processor as well as an audio mixing processing module, an FM receiving module and a WiFi communication module which are electrically connected to the first main control processor; the first microphone acquires an external audio signal, the audio mixing processing module performs audio processing on the acquired audio signal, and then the WiFi communication module transmits the processed audio signal to an in-vehicle system for real-time playback; and the WiFi communication module performs signal transmission with a smart mobile device;

wherein, an auxiliary microphone is provided to cooperate with the in-vehicle intelligent WiFi microphone, and the auxiliary microphone comprises a second main mounting housing, a second main control circuit board, a second rechargeable battery and a second microphone, wherein the second microphone, the second main control circuit board and the second rechargeable battery are arranged in the second main mounting housing, the second microphone is located at an upper end of the second main mounting housing, the second microphone and the second rechargeable battery are electrically connected to the second main control circuit board, and the second main control circuit board is integrally provided with a second main control processor as well as an audio mixing processing module, an FM transmission module and a Bluetooth communication module which are electrically connected to the second main control processor; and the second microphone acquires an external audio signal, the audio mixing processing module performs audio processing on the acquired audio signal, and then the FM transmission module transmits the processed audio signal to the intelligent WiFi microphone.

2. The in-vehicle intelligent WiFi microphone of claim 1, wherein, the first main control circuit board is further provided with a data storage module, a charging power module and a speech recognition module, and the data storage module, the charging power module and the speech recognition module are electrically connected to the first main control processor.

3. The in-vehicle intelligent WiFi microphone of claim 1, wherein, the first main control circuit board is integrally provided with a moving control key, a first on-off key and a first audio control key, and the first on-off key, the moving control key and the first audio control key are disposed on the first main mounting housing in a penetrating manner.

4. The in-vehicle intelligent WiFi microphone of claim 1, wherein, a first protection shield is arranged at the upper end of the first main mounting housing, a charging jack is arranged at a lower end of the first main mounting housing, the charging jack mates with an in-vehicle charger, and the in-vehicle charger comprises a microphone mounting seat and a vehicle charging connector connected to a vehicle USB interface.

5. The in-vehicle intelligent WiFi microphone of claim 1, wherein, a second protection shield is arranged at the upper end of the second main mounting housing, a charging jack is arranged at a lower end of the second main mounting housing, the charging jack mates with an in-vehicle charger or a charging plug connector, and the in-vehicle charger comprises a microphone mounting seat and a connector connected to a vehicle USB interface.

6. The in-vehicle intelligent WiFi microphone of claim 1, wherein, the auxiliary microphone and the in-vehicle intelligent WiFi microphone are placed on a charging base, and the charging base is provided with a second charging slot and a first charging slot corresponding to the auxiliary microphone and the in-vehicle intelligent WiFi microphone, respectively.

* * * * *